(12) United States Patent
Novoselov (10) Patent No.: US 9,400,381 B1
(45) Date of Patent: Jul. 26, 2016

(54) ELECTRODE CONFIGURATION FOR AN ELECTROWETTING DISPLAY DEVICE

(71) Applicant: Amazon Technologies, Inc., Seattle, WA (US)

(72) Inventor: Pavel Novoselov, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 14/223,559

(22) Filed: Mar. 24, 2014

Related U.S. Application Data

(60) Provisional application No. 61/938,476, filed on Feb. 11, 2014.

(51) Int. Cl.
*G02B 26/00* (2006.01)
*G09G 3/34* (2006.01)

(52) U.S. Cl.
CPC ............ *G02B 26/005* (2013.01); *G09G 3/3466* (2013.01)

(58) Field of Classification Search
CPC ............ G02B 26/0841; G02B 26/001; G02B 26/0833; G02B 26/02; G09G 3/3466
USPC .......... 359/245, 250–253, 290–299, 665, 666
See application file for complete search history.

(56) References Cited

U.S. PATENT DOCUMENTS

| | | | |
|---|---|---|---|
| 7,872,790 B2 * | 1/2011 | Steckl et al. | 359/253 |
| 7,903,317 B2 | 3/2011 | Feenstra et al. | |
| 2013/0057941 A1 * | 3/2013 | Massard et al. | 359/290 |

* cited by examiner

*Primary Examiner* — William Choi
*Assistant Examiner* — Vipin Patel
(74) *Attorney, Agent, or Firm* — EIP US LLP (57) ABSTRACT

In examples, an electrowetting element comprises an electrode for use in applying a voltage for controlling a configuration of first and second fluids which are immiscible. A surface of the electrode comprises a recess which is located away from a perimeter of the surface and which is formed by a region of the electrode having a reduced thickness.

24 Claims, 5 Drawing Sheets

ELECTRODE CONFIGURATION FOR AN ELECTROWETTING DISPLAY DEVICE

BACKGROUND

Electrowetting display devices are known. In an off state of a picture element of an example of such a device an oil layer covers a display area. In an on state the oil layer is retracted so as to cover less of the display area. To switch the picture element to the on state a voltage is applied via an electrically conductive fluid and an electrode, the conductive fluid being immiscible with the oil. To switch the picture element to the off state, the voltage is switched off.

It is desirable to improve the switching performance of an electrowetting display device.

DETAILED DESCRIPTION

Figure 1:
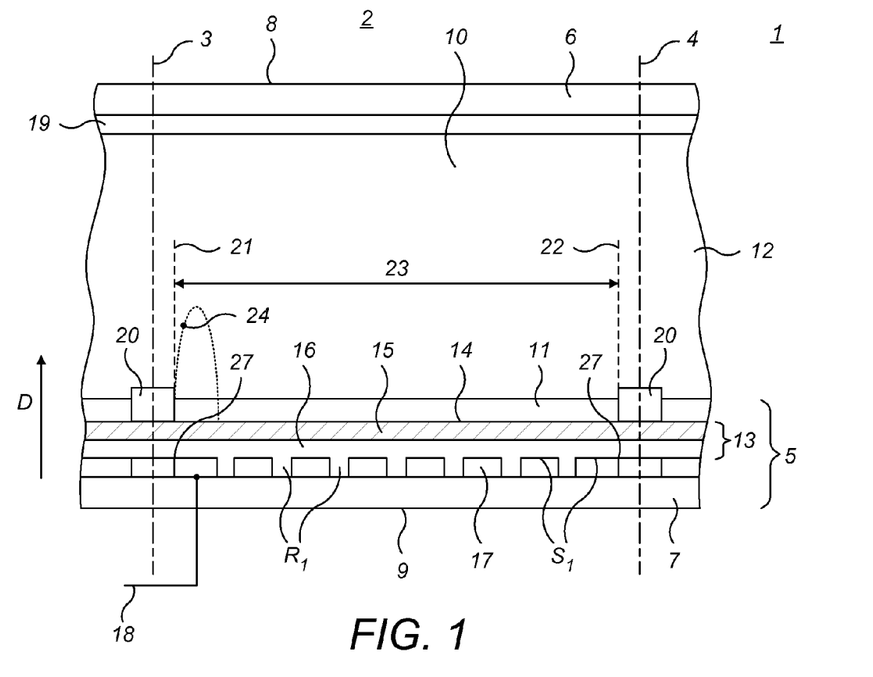
FIG. 1 shows schematically a cross section of a picture element of an example electrowetting display device.

FIG. 1 shows a diagrammatic cross-section of part of an electrowetting device in the form of an electrowetting display device 1. The display device includes a plurality of electrowetting elements, which are picture elements 2, one of which is shown centrally in the Figure with part of an adjacent electrowetting element shown either side. The lateral extent of the picture element is indicated in the Figure by two dashed lines 3, 4. The picture elements comprise a first support plate 5 and a second support plate 6. The support plates may be separate parts of each picture element, or the support plates may be shared in common by the plurality of picture elements. The support plates may include a glass or polymer substrate 6, 7 and may be rigid or flexible.

The display device has a viewing side 8 on which an image or display formed by the display device can be viewed and a rear side 9. In the Figure a surface of the first support plate 5 defines the rear side 9 and a surface of the second support plate 6 defines the viewing side; alternatively, a surface of the first support plate may define the viewing side. The display device may be of the reflective, transmissive, transflective or transparent type. The display device may be of a segmented display type in which the image may be built up of segments, each segment including several picture elements. The display device may be an active matrix driven display type, a direct drive display type or a passively driven display device. The plurality of picture elements may be monochrome. For a colour display device the picture elements may be divided in groups, each group having a different colour; alternatively, an individual picture element may be able to show different colours.

A space 10 between the support plates is filled with a plurality of fluids. In this example the plurality of fluids includes two fluids: a first fluid 11 and a second fluid 12 at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water or a salt solution such as a solution of potassium chloride in water. The second fluid may be considered an electrolyte. The second fluid may be transparent, but may be coloured, white, absorbing or reflecting. The first fluid is electrically non-conductive and may for instance be an alkane like hexadecane or (silicone) oil.

The first fluid absorbs at least a part of the optical spectrum. The first fluid may be transmissive for a part of the optical spectrum, forming a colour filter. For this purpose the first fluid may be coloured by addition of pigment particles or a dye. Alternatively, the first fluid may be black, i.e. absorb substantially all parts of the optical spectrum, for example 90% or more of visible light incident on the first fluid, or reflecting. A reflective layer may reflect the entire visible spectrum, making the layer appear white, or part of it, making it have a colour.

In examples, the support plate 5 includes an insulating layer 13 formed of at least one dielectric material. The insulating layer may be transparent or reflective. The insulating layer 13 may extend between walls of a picture element. However, to avoid short circuits between the second fluid 12 and electrodes arranged under the insulating layer, layers of the insulating layer may extend uninterrupted over a plurality of picture elements 2, thereby isolating the first liquid and the second liquid from the electrodes as shown in the Figure. The insulating layer has a hydrophobic surface 14 defining a side of the space 10 of the picture element 2. The thickness of the insulating layer may in examples be less than 2 micrometer and may be less than 1 micrometer.

The insulating layer may be a hydrophobic layer with a predetermined dielectric property; alternatively, it may include a hydrophobic layer 15 and a barrier layer 16 with predetermined dielectric properties, a surface of the hydrophobic layer 15 defining a side of the space 10, as shown in the Figure. The barrier layer 16 may have a thickness, taken in a direction perpendicular to the plane of the substrate, of for example between 50 nanometers and 500 nanometers and may be made of an inorganic material like silicon oxide or silicon nitride or a stack of these (for example, silicon oxide-silicon nitride-silicon oxide) or an organic material like polyimide or parylene. The barrier layer may comprise multiple layers having different dielectric constants. The hydrophobic layer may be formed of an amorphous fluoropolymer layer such as AF1600 or AF1601 (available from DuPont, 1007 Market St., Wilmington, Del., USA), Hyflon AD® (available from Solvay, Solvay SA, rue de Ransbeek, 310-B-1120 Brussels, Belgium), Cytop (available from AGC Chemicals Europe, Ltd, PO Box 4, York House, Hillhouse International, Thornton Cleveleys, Lancashire FY5 4QD, United Kingdom) or any other low surface energy polymer, for example. It is further envisaged that non-polymer materials may be used to form the hydrophobic layer.

In an off state, no voltage is applied and the hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference between surface tension of the fluid and the surface energy of the solid at the fluid-solid boundary. For example, a high difference in surface tension and surface energy can indicate hydrophobic properties.

In examples, each element 2 includes an electrode 17, also referred to herein as the first electrode, as part of the first support plate 5, i.e. the first electrode is located in the first support plate. The first electrode 17 is separated from the fluids by the insulating layer 13. Thus in examples, at least one dielectric material is located between the first electrode and a display area 23 (described later). First electrodes of neighbouring picture elements are separated by a non-conducting layer. In some examples, further layers may be arranged between the insulating layer 13 and the first electrode 17. The first electrode is formed of an electrically conductive material, which in examples described herein is transmissive for light, for example indium tin oxide (ITO).

The first electrode 17 of a picture element is supplied with voltage signals by a signal line 18, schematically indicated in the Figure. A second signal line (not shown) is connected to a second electrode 19 that is in contact with the second fluid 12 which is conductive in this example. The second electrode is formed of an electrically conductive material, for example indium tin oxide (ITO). The second electrode 19 may as shown in FIG. 1 for example be formed as a layer of the second support plate 6, which second electrode layer is in electrical contact with the second fluid.

The second electrode may be a common electrode common to all elements, for example when they are fluidly interconnected by and share the second fluid, uninterrupted by walls, when the walls extend partly from the first support plate to the second support plate. The picture element 2 of FIG. 1 can be controlled by a voltage V applied between the first and second signal lines. The second electrode may be a ground, i.e. earth, electrode; for example an electric potential of zero volts may be applied to the second electrode; or in other embodiments a non-zero voltage may be applied to the second electrode. As the second electrode is in electrical contact with the second fluid, an electric potential applied to the second electrode is applied to the second fluid. A non-zero electric potential may be applied to the first electrode. Thus, a voltage for driving the element to a desired fluid configuration using the applied voltage V may be applied between the first electrode and the second fluid. The electrodes 17 on the substrate 7 are coupled to a display driving system. In a display device having the picture elements arranged in a matrix form, the electrodes can be coupled to a matrix of control lines on the substrate 7.

In the present example, the first fluid 11 is confined to one picture element by walls that follow the cross-section of the picture element. The cross-section of a picture element may have any shape; when the picture elements are arranged in a matrix form, the cross-section is usually square or rectangular. Although the walls are shown as structures protruding from the insulating layer 13, they may in other examples instead be a surface layer of the support plate with a wettability that repels the first fluid, such as a hydrophilic or less hydrophobic layer. The lateral extent of the picture element, indicated by the dashed lines 3 and 4, is defined by the centre of the walls. The area between the walls of a picture element, indicated by the dashed lines 21 and 22, is called the display area 23, over which a display effect occurs. Each wall at least partly confines the first fluid to the element; each wall being a wall formed along a side of the display area.

Figure 2:
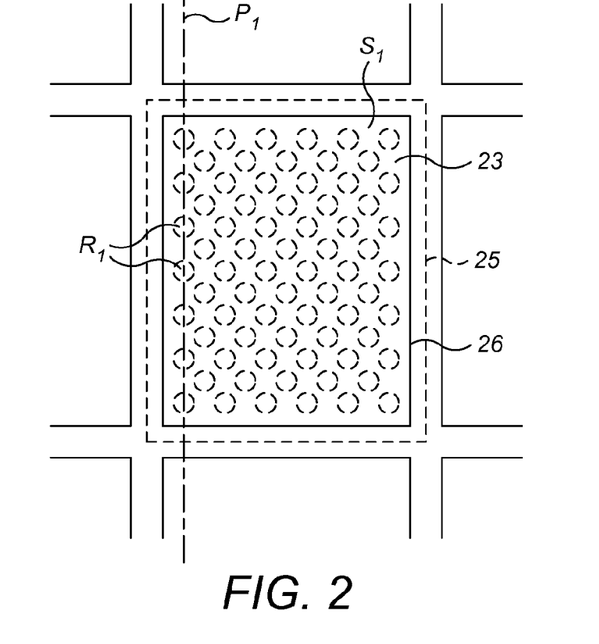
FIG. 2 shows schematically a plan view of part of a support plate of the display device of FIG. 1.

FIG. 2 shows a matrix of rectangular picture elements in a plan view of the hydrophobic layer of the first support plate. The lateral extent of the central picture element in FIG. 2, corresponding to the dashed lines 3 and 4 in FIG. 1, is indicated by the dashed line 25. Line 26 indicates the inner border of at least one wall; the line is also the edge of the display area 23. A pattern of the at least one wall covers a wall area and in this example is shown as forming a grid.

In examples described herein, the first fluid adjoins at least part of a surface of the first support plate, this surface being in the present example the surface 14 of the hydrophobic layer 15 which provides the display area 23. In this example, when no voltage is applied between the electrodes, i.e. when the element is in an off state, the first fluid 11 forms a layer between the walls, as shown in the FIG. 1. Application of a voltage will contract the first fluid, for example against a wall as shown by the dashed shape 24 in FIG. 1, thus changing the extent the first fluid and the second fluid adjoin the display area. The controllable shape of the first fluid and second fluids is used to operate the picture element as a light valve, providing a display effect over the display area 23. The display effect providable by the electrowetting element therefore depends on the extent the first and second fluids adjoin the display area. When applying a voltage to contract the first fluid, the second fluid adjoins at least part of the surface of the insulating layer 13, in this example the display area 23, the extent of second fluid adjoinment depending on the extent of first fluid contraction. Thus, when applying a voltage to contract the first fluid, the second fluid displaces part of the first fluid adjoining the surface and in doing so moves the first fluid to the contracted form.

The first electrode 17 has a surface $S_1$ facing the display area 23 and lying in a plane parallel to the display area. The surface $S_1$ may therefore be the closest surface of the first electrode to the display area. The surface has a perimeter 27, i.e. a boundary or an outer edge. In examples, for example that of FIGS. 1 and 2, the perimeter 27 coincides with, i.e. is aligned with, a lateral extent of the first electrode 17. Therefore, when viewed along an axis taken perpendicular to a plane of the display area 23, the edge 26 of the display area 23 coincides with the perimeter 27. In other examples, a lateral extent of the first electrode may extend under the walls 20 meaning that a perimeter of the surface $S_1$ of the first electrode does not coincide with the edge 26 of the display area 23. In all these examples, the display area overlaps the surface $S_1$ of the first electrode such that a voltage may be applied between the first electrode and the second fluid in order to change a configuration of the first and second fluids so as to provide a desired range of display effects.

In examples described herein, the surface $S_1$ of the first electrode, which surface $S_1$ is facing towards the display area, comprises a recess. A recess is a region of the first electrode with a reduced thickness, taken in a direction D perpendicular to a plane of the surface $S_1$ of the first electrode facing the display area, compared with the thickness of a region of the first electrode immediately surrounding the recess. In other words, the boundary of the recess taken in the plane of the surface $S_1$ defines a change in thickness of the first electrode. A recess is therefore surrounded by first electrode material. It is to be noted that a recess is not a cut-out or other removed part of first electrode material at a perimeter of the first electrode. Such a cut-out or other removed part would change the shape of the perimeter of the surface of the first electrode facing the display area and which lies in the plane parallel to the display area; this change of perimeter shape means the first electrode perimeter would not align in examples with the perimeter of the display area when viewed along an axis perpendicular to the display area. In contrast, a recess as described herein does not change the shape of a perimeter of the surface of the first electrode facing the display area; i.e. the recess is within the perimeter of the surface, i.e. the recess is located away from the perimeter. Thus, an area of the recess, which may otherwise be referred to as an extent of the recess, does not contact or overlap with any part of the perimeter 27 of the surface. In further examples, where the first electrode extends under the walls, the recess may be located away from the first electrode perimeter so as to be away from an edge of a region of the first electrode surface $S_1$ which coincides with the edge 26 of the display area 23 when viewed along the axis perpendicular to the display area plane; thus, the recess may not be overlapped by the edge 26 of the display area. By locating at least one recess so as not to be overlapped by the edge of the display area, the recess may not influence the strength of an electric field applied along an inner edge of the walls when applying the voltage. Thus, fluid switching forces between the fluids and the walls may be unaffected by one or more of the recesses, providing an efficient and controllable flow of the fluid in the display area.

In examples, the first electrode may comprise one or a plurality of recesses including at least one recess located away from the first electrode perimeter. One or more recesses may comprise an opening through the electrode, for example as illustrated using FIGS. 1 and 2. An opening is an aperture, a gap or a hole through the first electrode, meaning that at the location of the recess there is an absence of first electrode material through the first electrode structure. An opening or a plurality of openings in the first electrode may reduce the total number of defects inherent in the electrode structure, compared with known electrode structures, owing to the absence of first electrode material in the electrode structure at the location of the openings; fewer defects can provide more uniform switching of the fluids.

Figure 6:
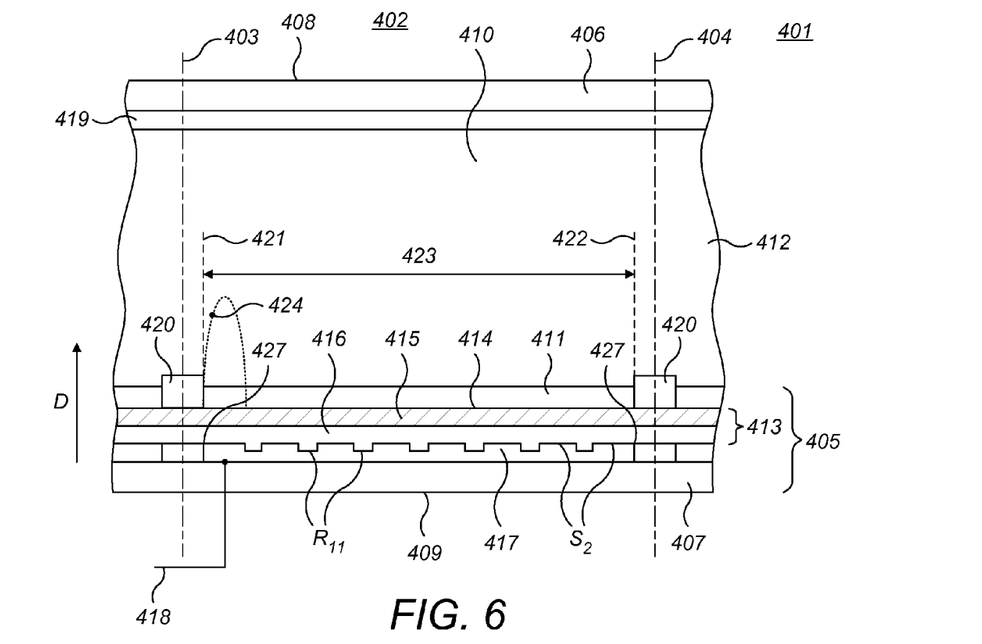
FIG. 6 shows schematically a cross section of a picture element of another example of an electrowetting display device.

In alternative examples, for example that of FIG. 6 described later, one or more recesses may comprise a depression of the surface of the first electrode facing the display area, instead of an opening. A depression may be an indentation, a dip, a concavity, a lowering or a hollow of the surface of the first electrode. It is noted that the depression is a reduction in thickness of the first electrode at the location of the recess, the thickness being taken in a direction D perpendicular to a plane of the first electrode surface facing the display area, compared with the thickness of the first electrode surrounding the recess. Therefore, in examples, a surface of the first electrode facing away from the display area may be planar, with the thickness of the first electrode relative to this surface reducing in the presence of a depression. This is different from known examples of an electrode layer which is non-planar, i.e. having an upper and a lower non-planar surface, with the electrode layer having a constant thickness. Such a non-planarity in an electrode layer may be used to form a via, i.e. a through connection or contact, to connect the electrode layer with an underlying electrical connector. Thus, a through-connection is not a recess as defined herein.

In examples, one or more recesses may be at least partly filled by a dielectric material. For example, the dielectric material of the barrier layer 16, which forms a dielectric layer on the surface $S_1$ of the first electrode, may completely fill the recess.

In the example of FIGS. 1 and 2, the surface $S_1$ comprises a plurality of recesses $R_1$ located away from the perimeter 27 of the surface.

In this example each of the recesses $R_1$ is filled by a dielectric material, in this example the dielectric material forming the barrier layer 16, as shown in FIG. 1.

Further examples are envisaged with the surface of the first electrode comprising one or more recesses comprising a depression and one or more different recesses comprising an opening in the first electrode.

It has been found that providing one or more recesses in the surface of the first electrode, located away from the perimeter, as described above, can improve switching of the first and second fluids between different fluid configurations. This therefore improves the switching between different display effects provided by the element.

The improvement in switching results from a reduction in the capacitance of the picture element. As is known, an electrowetting element includes a capacitor; a first plate of the capacitor is the first electrode and a second plate of the capacitor is the second fluid, which is provided with electric charge via the second electrode. The insulator layer, including in the example of FIG. 1 the hydrophobic and barrier layers form a dielectric layer between the first electrode and the second fluid. Further, the first fluid acts as a dielectric material between the first electrode and the second fluid. It will be appreciated that the magnitude of voltage applied between the first electrode and the second fluid depends on the capacitance of the element. As a thickness of the first fluid changes when a voltage is applied, the amount of dielectric material between the second fluid and the first electrode is different for different applied voltages. When a voltage is applied between the first electrode and the second fluid, for changing a configuration of the first and second fluids, there is a delay from the time when the voltage is first applied to the time when the fluids start to move in response to the applied voltage. This delay is problematic, as the fluids do not instantaneously move to the new configuration corresponding with the applied voltage. Instead, after the delay and as the first fluid changes configuration and therefore thickness, the capacitance of the element changes. In turn, the voltage applied between the second fluid and the first electrode may also change. For example, with a decrease in capacitance, the voltage applied locally between the first electrode and the second fluid may increase. The change in voltage can cause the fluids to move to a configuration which does not correspond with the intended configuration corresponding with the voltage applied to the signal lines connected to the first and second electrodes before movement of the fluids. The magnitude of the change in capacitance is not linear. In other words, the capacitance change depends on the absolute magnitude of the applied voltage on the signal lines, even if a difference between the applied voltage and a previously applied voltage is the same. Further, the change in capacitance may depend on whether the fluids are being driven to reduce or increase the extent of the display area adjoined by the first fluid. Thus, the change in capacitance can be problematic in driving a change in configuration of the first and second fluids, as it may be difficult to obtain the desired fluid configuration when applying a given voltage between the signal lines.

The effect of this change in capacitance on fluid switching depends on the capacitance of the picture element, specifically the capacitor formed between the first electrode and the second fluid; for example an element having a higher capacitance in the off state compared with an element with a lower capacitance in the off state may exhibit greater changes in capacitance as the fluids change configuration.

To reduce the effects of this change of capacitance when switching between two different fluid configurations, it has been realised that the capacitance of the element may be reduced by modifying a form of the first electrode. More specifically, as in examples described herein, a surface of the electrode which faces the display area comprises one or more recesses, which for example comprise a depression or an opening. For a depression, a separation of the surface of the first electrode depression from the display area is greater than for a surface of the first electrode surrounding the depression. Thus, a capacitance of the element is decreased at the recess location, due to the increased distance between the surface of the depression and the second fluid. Where the recess comprises an opening in the first electrode, there is no capacitance between the location of the recess and the second fluid, therefore the area of the capacitor plate formed by the first electrode is reduced, thus decreasing capacitance. Thus, using at least one depression, opening or a mixture of both, a capacitance of the element may be reduced. As a result, the effects caused by the change of capacitance when driving the fluids between configurations may be reduced. Thus, a switching performance of the display device may be improved.

Numerous factors relating to one or more recesses may be controlled to control the capacitance between the first electrode and the second fluid, to improve switching performance. One or a combination of these factors may be used in examples to control the capacitance. These factors may also be used to control other properties of the element, for example where motion of the fluids initiates when applying a voltage, where the first fluid tends to collect when applying a voltage and/or a direction of motion of the first fluid when a voltage is applied. These factors will now be described in general. Then, specific examples will be described with reference to the FIG. It is to be noted that such examples are for illustration purposes and that numerous further examples are envisaged, which include one or more variations of the factors described for controlling the capacitance.

One factor for controlling the capacitance is an area, which may otherwise be referred to as an extent, of at least one recess. The area is taken in a plane of the surface of the first electrode which faces the display area and which defines the perimeter of the first electrode, which plane in examples is parallel to the plane of the display area. The area is taken in the plane, which is defined by a boundary of the recess. At least one recess may have a different area than a different recess. For example, the area of a first recess may be smaller than the area of a second recess. A longest dimension of the area of a recess of examples, for example the diameter of a circular recess, may be in the range of 5 to 40 micrometers.

Another factor is the shape of at least one recess. The shape is defined in the plane of the surface of the first electrode which comprises the at least one recess and which faces the display area. The shape is defined by a boundary, i.e. an outline, of the recess in the plane. The boundary may define a circle, an ellipse, i.e. an oval, or the outline of a figure of eight. Where there is a plurality of recesses, all or more than one recess may have substantially the same shape or in other examples different recesses may be differently shaped. Substantially the same means for example that the shape of different recesses is the same within manufacturing tolerances, so the intended function of the recesses is not impaired.

A further factor, in examples with a plurality of recesses, is to use a mixture of depressions and openings to control the capacitance. A depth of different depressions may be different, again to control the capacitance.

Another factor is a distance between adjacent recesses, the distance being taken in the plane of the surface of the first electrode which comprises recesses and which faces the display area. The plurality of recesses may include a first recess and a plurality of further recesses adjacent to the first recess, one of the first recess and the plurality of further recesses being a recess located away from the perimeter of the surface as described herein. The first recess may be any recess with more than one adjacent recess. An adjacent recess is a recess closest in distance, i.e. a closest neighbouring recess, to the first recess compared to at least one other recess. There may be more than one further recess adjacent to the first recess, a distance between the first recess and each of the further recesses being substantially equal, the distance being taken in the plane of the surface of the first electrode parallel to the display area plane and which surface comprises the recesses and faces the display area.

A further factor is the location of one or more recesses in the surface of the first electrode facing the display area. For example, a recess may be located substantially centrally in the surface. Substantially centrally in examples means that a centre point of the area of the recess in the plane of the surface substantially coincides, within a variation due to manufacturing tolerances, with a centre point of the surface of the first electrode when viewed along an axis perpendicular to the display area.

Related to the location of the one or more recesses in the surface of the first electrode, another factor is a distribution of a plurality of recesses in the surface. The distribution may for example be a regular distribution, with substantially equal spacing, i.e. a distance, between each recess and adjacent recesses, taken in the plane of the surface of the first electrode, which surface faces the display area. In other examples, the distribution may for example be irregular, for example with different spacing between at least one recess and adjacent recesses. Further, recesses may be distributed across the entire or a majority, i.e. greater than 50%, of the first electrode surface. Alternatively, recesses may be located in a minority, i.e. lower than 50%, of the first electrode surface.

Examples of first electrode configurations will now be described. These examples are illustrative and numerous further examples are envisaged which may include a combination of features of different examples and/or one or more of the factors described above.

Referring to FIGS. 1 and 2, with FIG. 1 being taken in the plane $P_1$ illustrated in FIG. 2, a plurality of recesses $R_1$ is illustrated for the picture element 2. It is to be appreciated that in examples the other picture elements may have the same or a different first electrode configuration. In FIG. 2, the recesses $R_1$ are illustrated with dashed lines to indicate them underlying the display area. In this example each recess $R_1$ is an opening through the first electrode and is filled with the dielectric material of the barrier layer. The surface $S_1$ of the first electrode facing the display area in this example lies in a plane parallel to the display area 23.

In this example, a shape defined by a boundary of each of the plurality of recesses and taken in the plane of the surface $S_1$ is substantially the same. FIG. 2 shows that the boundary of each recess in the plane defines a circular outline. In other words each recess has a circular cross section taken in the plane of the surface $S_1$. A circular or curved cross-section, being a shape without corners or vertices, may aid smooth movement of the fluids during switching of configurations. This is because, when moving the fluids during switching, a three phase line defining a boundary between the first fluid, the second fluid and the display area does not encounter sharp transitions in electric field when moving across the display area during switching. The shape of the recesses affects a pattern of regions of the display area of stronger, weaker and/or a lack of electric field between the first electrode and the second fluid when a voltage is applied. Sharp transitions between such regions may cause irregular movement of the three phase line whereas curved or circular transitions may encourage a smoother movement of the three phase line.

In the example of FIGS. 1 and 2, the plurality of recesses includes a first recess and a plurality of further recesses adjacent to the first recess. The first recess may be any recess illustrated with more than one adjacent recess. An adjacent recess is illustrated in FIG. 2 as a recess closest in distance, i.e. a closest neighbouring recess, to the first recess compared to other recesses. In this example there is more than one further recess adjacent to the first recess, a distance between the first recess and each of the further recesses being substantially equal, the distance being taken in the plane of the surface $S_1$ parallel to the display area plane. In the present example, the recesses are uniformly distributed across the surface $S_1$ of the first electrode, i.e. the recesses are regularly spaced from each other. Therefore, regions of weaker or no electric field resulting from the recesses are spread uniformly across the display area. In examples, this uniform distribution aids smooth flow of the three phase line across the display area during switching, compared with an irregular distribution of recesses. It is noted that where it is described herein that there may be no electric field for a region of the display area, this does not exclude the existence of stray electric field lines or electric field lines due to fringe fields within the region where there is no electric field.

In the present example of FIGS. 1 and 2, an area of each of the plurality of recesses is substantially equal, i.e. of substantially the same size. The area of a recess is defined by a boundary of the recess in the plane of the surface $S_1$. The area of each recess being substantially equal contributes to the uniform distribution of regions of different electric field strength when a voltage is applied as described previously and therefore to a smooth flow of the three phase line.

Figure 3:
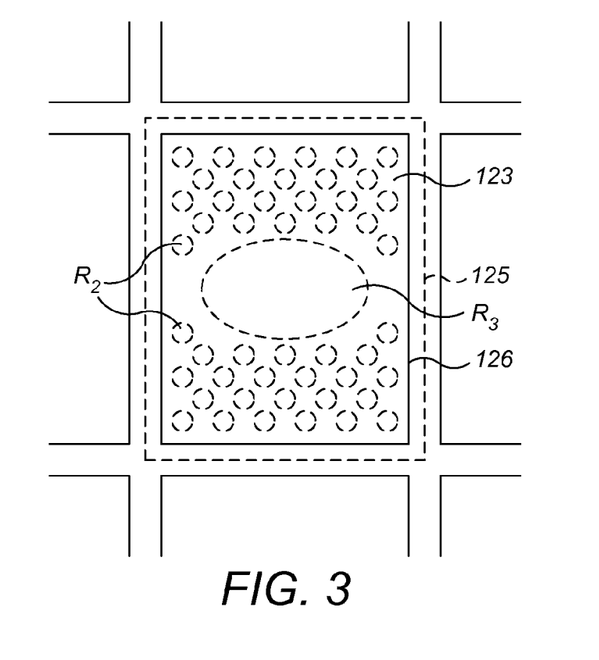
FIGS. 3 to 5 show schematically a plan view of part of a support plate of different examples of an electrowetting display device.

FIG. 3 illustrates a different example of part of a support plate of an electrowetting display device. This example is the same as in FIGS. 1 and 2 except for the configuration of the surface of the first electrode facing the display area. Features are illustrated which are similar to those of FIGS. 1 and 2; the same reference numerals are used, incremented by 100; corresponding descriptions apply.

In this example, the surface of the first electrode facing the display area 123 comprises a plurality of recesses. In this example the recesses comprise openings in the first electrode but in other examples one or more of the recesses may comprise a depression. An area of a first recess of the plurality of recesses is smaller than an area of a second recess of the plurality. These areas are taken in the plane of the surface of the first electrode. One of the first recess and the second recess may be the recess located away from the perimeter of the surface. In this example there is a plurality of the first recess, two of which are labelled $R_2$ in FIG. 3; each of the first recesses may be of similar shape and area as the recesses of FIGS. 1 and 2. The second recess is labelled $R_3$ in FIG. 3. A boundary of the second recess in the plane of the first electrode surface defines an elliptical outline. A diameter of the area of each first recess may for example be in the range of 4 micrometers to 10 micrometers. The area of the second recess may depend on a height of the walls and may for example occupy approximately 30% of the total display area.

The difference of area of the first and second recesses may be used to control motion of the fluids when applying a voltage. With the second recess being larger than the first recesses, the second recess defines a larger region of the display area where no or a reduced electric field is present when a voltage is applied compared with each region of the display area corresponding with the first recesses. With this difference in area of no or a reduced electric field between the first and second recesses, a direction of motion of the first fluid when applying a voltage is established. This is because, when applying a non-zero voltage between the first electrode and the second fluid, to switch the first fluid from a first configuration to a second configuration, a stronger electric field is applied in the region of the display area overlapping a region of the first electrode which includes the first recesses $R_2$ and first electrode material between neighbouring first recesses $R_2$, compared with a region of the display area overlapping the second recess $R_3$, where no electric field is applied. With the second recess having a larger area than each first recess, the second recess defines a larger region of the display area where no electric field is applied compared with the first recesses. Therefore, when applying the voltage, the first fluid tends to move towards the region of the display area overlapping the second recess $R_3$, due to the lack of electric field in this region. Therefore, when applying the non-zero voltage, the first fluid moves in a direction from a first region of the display area which overlaps the first recess towards a second region of the display area which overlaps the second recess. Thus, a first location in the surface of the electrode of the first recess and a second location in the surface of the electrode of the second recess defines a path for movement of the first fluid from the first region to the second region. Thus, a direction of moving the first fluid when a non-zero voltage may be determined; this technique may be applied in other examples other than the example of FIG. 3 currently being described.

With the first fluid tending to move to the region of the display area overlapping the second recess, a location of the second recess may therefore define a collection region of the display area for the first fluid to collect in when a non-zero voltage is applied between the first electrode and the second fluid. For example, when a non-zero voltage is applied when the fluids are in the off state, motion of the first fluid may initiate at the edge of the display area with the first fluid then moving towards the collection region, which in the example of FIG. 3 corresponds with the area of the second recess.

It is to be appreciated that the technique of a recess forming a collection region, as described in relation to FIG. 3, may be used in other examples. For example, an electrowetting element may comprise one or more recesses in the first electrode, one recess defining a collection region of the display area, the location of the recess in the surface defining the location of the collection region and therefore a path for movement of the first fluid from a region of the display area outside the collection region to the collection region, in response to applying a non-zero voltage between the electrode and the second fluid.

Figure 4:
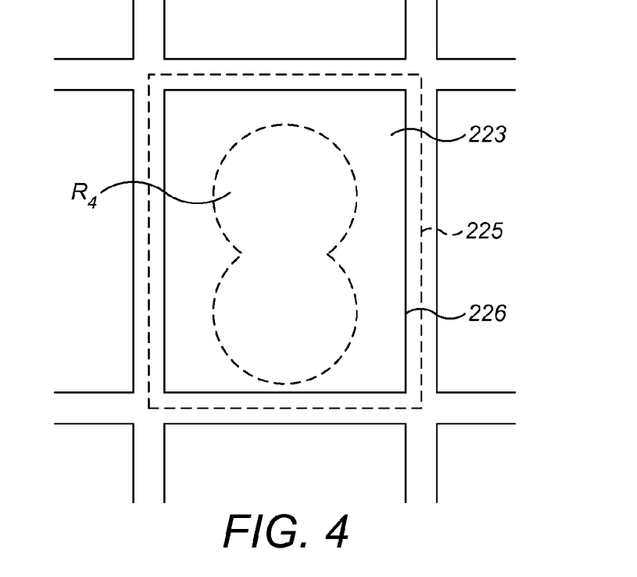

FIG. 4 shows another example of part of a support plate of an electrowetting display device. This example is the same as in FIGS. 1 and 2 except for the configuration of the first electrode. Features are illustrated which are similar to those of FIGS. 1 and 2; the same reference numerals are used, incremented by 200; corresponding descriptions apply.

In this example the surface of the first electrode which faces the display area 223 comprises one recess which in this example is an opening. A boundary of the recess in the plane of the surface of the first electrode facing the display area defines an outline of a figure of eight. The recess is in this example not centrally located in the surface of the first electrode; instead the recess is closer to one edge of the perimeter of the first electrode than to an opposite edge of the perimeter. The recess is however centrally located between the other two opposite edges of the perimeter. This non-central location defines a region of the display area which does not overlap the recess; in this region a stronger electric field is applied compared with a region of the display area overlapping the recess. Thus, fluid motion initiates in the non-overlapping region when a non-zero voltage is applied and the first fluid tends to collect in the region overlapping the recess. Thus, improved switching performance as described previously may be obtained. A figure of eight shape may be considered to have two lobes. Each lobe of the figure of eight outline may be considered a circular outline overlapping with a circular outline of the other lobe of the figure of eight outline. In further examples, a diameter of the circle of one lobe may be different from the diameter of the circle of the other lobe.

Figure 5:
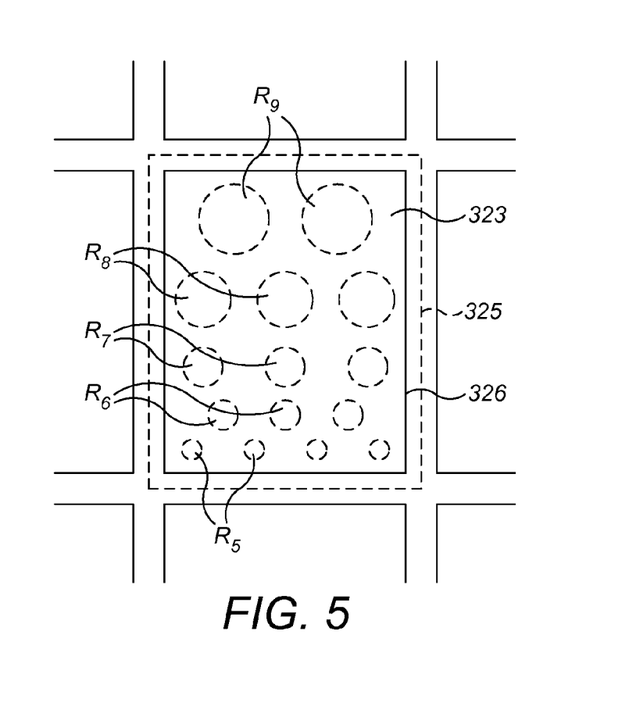

FIG. 5 shows another example of part of a support plate of an electrowetting display device. This example is the same as in FIGS. 1 and 2 except for the configuration of the first electrode. Features are illustrated which are similar to those of FIGS. 1 and 2; the same reference numerals are used, incremented by 300; corresponding descriptions apply.

In this example the surface of the first electrode facing the display area comprises a plurality of recesses. In this example each recess has a circular area. There are groups of the recesses having a different area; i.e. the area of each recess of one group is substantially the same. One of the groups includes a recess located away from the perimeter of the surface. In this example, there are the following groups: a first group of recesses, two of which are labelled $R_5$, with a first area; a second group of recesses, two of which are labelled $R_6$, with a second area; a third group of recesses, two of which are labelled $R_7$, with a third area; a fourth group of recesses, two of which are labelled $R_8$, with a fourth area; and a fifth group of recesses, two of which are labelled $R_9$, with a fifth area. The area of the recesses of each group increases from the first group to the fifth group. In other words, the recesses of the fifth group have a larger area than the recesses of the fourth group, the recesses of the fourth group have a larger area than the recesses of the third group, the recesses of the third group have a larger area than the recesses of the second group and the recesses of the second group have a larger area than the recesses of the first group. In examples, the groups of recesses are located such that the size of area of the recesses increases from one side of the surface of the first electrode facing the display area to an opposite side of the surface of the first electrode facing the display area. In this example, the recesses of each group are arranged in separate rows, with each row including the recesses of one group, the rows being arranged parallel to each other. The rows are arranged such that the area of the recesses increases row-wise from the one side to the opposite side of the first electrode surface, as illustrated in FIG. 5. By increasing the area of the recess in the direction from one side to an opposite side of the first electrode surface, a direction of motion of the first fluid may be determined, for when a voltage is applied. This direction of motion is due to the pattern of regions of the display area with an overall weaker or stronger electric field when the voltage is applied, depending on the area of the underlying recesses. In this example, the first fluid tends to move from the side of the surface with the first group of recesses $R_5$ to the side of the surface with the fifth group of recesses $R_9$. It is to be noted that FIG. 5 shows one example. Many further, different, examples are envisaged with groups of differently sized recesses arranged to influence the direction of first fluid movement.

Examples described so far in relation to FIGS. 1 to 5 relate to examples where each recess comprises an opening. FIG. 6 illustrates a part of a support plate similar to that of FIGS. 1 and 2. Features are illustrated which are similar to those of FIGS. 1 and 2; the same reference numerals are used, incremented by 400; corresponding descriptions apply. The difference between the example of FIGS. 1 and 2 compared with the example of FIG. 6 is that in the example of FIG. 6 the recesses do not comprise openings but instead comprises depressions $R_{11}$. The surface of the first electrode facing the display area and lying in a plane is labelled $S_2$ rather than $S_1$ and is the surface of the first electrode surrounding the recesses. In examples where the recesses comprise a depression, each depression also comprises a further surface, which is out of the plane of the surface $S_2$, due to the depth of the depression compared with the surface $S_2$. As illustrated, each depression $R_{11}$ is defined by a reduction in thickness, taken in a direction perpendicular to the plane of the surface $S_2$ of the first electrode compared with the thickness of the first electrode surrounding each depression. Therefore, in examples, a surface of the first electrode facing away from the display area and in contact with the substrate 7 is planar, in a plane parallel to the display area. In examples, a transition from the surface $S_2$ to the recess, which transition forms an edge of the recess $R_{11}$, which edge defines the boundary between the surface $S_2$ and the recess $R_{11}$, may be perpendicular; in other examples the transition may be curved rather than perpendicular, which may cause a more uniform application of electric field when a voltage is applied and therefore a more efficient fluid switching.

Figure 7:
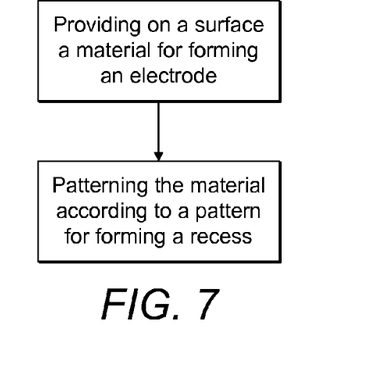
FIG. 7 shows a flow chart relating to an example method of manufacturing a support plate.

An example of a method of manufacturing a support plate for at least one electrowetting element will now be described with reference to features of FIGS. 1 and 2 and also to FIG. 7. It is to be appreciated that the method may be adapted appropriately for manufacturing the first support plate illustrated in FIG. 6. During the manufacturing process of the display device, the first support plate may be manufactured entirely, or may be provided during the manufacturing process as a partly or completely assembled support plate. When manufacturing the first support plate according to an example the substrate 7 is provided. An electrode layer comprising at least one electrode 17, corresponding to the first electrode described above, is provided on the substrate 7. A material for forming the at least one electrode is provided on a surface for example that of the substrate and the material is patterned for forming the at least one electrode according to a pattern for forming one or more recesses. In some examples, the first electrode material may be applied on the substrate with the pattern for forming the one or more recesses, for example using an appropriate masking technique. In other examples, a non-patterned layer of the first electrode material may be applied on the substrate which is then patterned for forming one or more recesses. Where the first electrode material is for example ITO, a plasma enhanced chemical vapour deposition technique or a DC (direct current) magnetron sputtering technique may be used, as the skilled person would know.

Subsequently, the insulating layer 13, which in this example includes the barrier layer 16 and the hydrophobic layer 15, is provided on the first electrode structure. With the barrier layer being formed of a dielectric material, in examples, a dielectric material is provided on the material patterned for forming the electrode, thereby forming a layer of the dielectric material on the electrode. The dielectric material therefore at least partly fills the one or more recesses. This providing of the dielectric material, for example to form the barrier layer, may be provided using Chemical Vapour Deposition (CVD) or Physical Vapour Deposition (PVD) for example sputter deposition or electron beam evaporation where temperature, pressure and power are controlled appropriately, as would be understood by the skilled person. The hydrophobic layer 15 may then be provided on the barrier layer, or in other examples on the electrode layer, for example by a wet coating process such as slit coating, flexoprinting, spin coating or dip coating as is well known in the art. The hydrophobic layer in the examples given here is a continuous uninterrupted layer of the first support plate common to all picture elements. The walls may then be formed, for example by photolithography using a SU8 photoresist material, which would be well known to the skilled person.

Once the first support plate is manufactured it may be assembled with a pre-manufactured second support plate, to assemble one or more electrowetting elements by attaching the first and second support plates together, for example using an adhesive seal at an outermost perimeter of an array of the one or more electrowetting elements, after having provided the first and second fluids in the space to be formed between the first and second support plates. The skilled person will readily appreciate suitable techniques for this.

It is to be appreciated that other manufacturing methods may be used to manufacture the first support plate.

The above examples are to be understood as illustrative examples. Further examples are envisaged. For example, a cut-out is described above which is different from a recess described herein. In further examples, a first electrode may include a cut-out in addition to at least one recess, the cut-out being used for example to control fluid motion upon applying a voltage, for example to define a collection region for the first fluid.

It is to be appreciated that numerous further examples are envisaged than those described above, which may use one or a combination of the factors described above. In examples, the factors described above may be appropriately selected and tuned so that a reduced capacitance is obtained whilst also obtaining an appropriate motion of the fluids when applying a voltage, including a strong enough force on the fluids to move the fluids when applying the voltage.

A plurality of recesses is referred to above. A plurality means two or more and therefore covers examples with any integer number of recesses of two or more, for example two, three, four, five or a greater integer number. Thus, any integer number of two or greater is considered to be described herein in relation to the plurality of recesses.

It is to be understood that any feature described in relation to any one example may be used alone, or in combination with other features described and may also be used in combination with one or more features of any other of the examples, or any combination of any other of the examples. Furthermore, equivalents and modifications not described above may also be employed without departing from the scope of the accompanying claims.

What is claimed is:

1. An electrowetting display device comprising an electrowetting element comprising:
   a first fluid and a second fluid immiscible with the first fluid;
   a display area;
   an electrode formed of an electrically conductive material, the electrode having:
      a first surface comprising a recess located away from a perimeter of the first surface and formed by a region of the electrode having a reduced thickness compared with a thickness of a region of the electrode immediately surrounding the recess, and
      a planar second surface extending from the region of the electrode having the reduced thickness and beyond the region of the electrode immediately surrounding the recess, at least part of the first surface located between the planar second surface and the display area; and
   at least one dielectric material located between the electrode and the display area.

2. An electrowetting display device according to claim 1, wherein the first surface comprises a plurality of recesses, the plurality of recesses comprising the recess located away from the perimeter of the first surface.

3. An electrowetting display device according to claim 2, the plurality of recesses comprising a first recess and a plurality of further recesses adjacent to the first recess, a distance between the first recess and each of the further recesses being substantially equal, one of the first recess and the plurality of further recesses being the recess located away from the perimeter of the first surface.

4. An electrowetting display device according to claim 2, at least part of the first surface lying in a plane, wherein an area of each of the plurality of recesses in the plane is substantially equal.

5. An electrowetting display device according to claim 2, at least part of the first surface lying in a plane and the plurality of recesses comprising a first recess and a second recess, wherein an area of the first recess in the plane is smaller than an area of the second recess in the plane, one of the first recess or the second recess being the recess located away from the perimeter of the first surface.

6. An electrowetting display device according to claim 5, the first fluid being switchable from a first configuration to a second configuration in response to a non-zero voltage applied between the electrode and the second fluid, wherein the first recess is located at a first location in the first surface and the second recess is located at a second location in the first surface, the display area having a first region overlapping the first recess and the display area having a second region overlapping the second recess, the first location and the second location determining a path from the first region to the second region for movement of the first fluid during switching from the first configuration to the second configuration.

7. An electrowetting display device according to claim 2, at least part of the first surface lying in a plane and the plurality of recesses comprising a first group of recesses and a second group of recesses, one of the first group of recesses or the second group of recesses comprising the recess located away from the perimeter of the first surface, wherein an area of each recess of the first group of recesses is substantially equal and an area of each recess of the second group of recesses is substantially equal, the area of each recess of the first group of recesses being smaller than the area of each recess of the second group of recesses.

8. An electrowetting display device according to claim 2, at least part of the first surface lying in a plane and the plurality of recesses comprising a first group of recesses and a second group of recesses, one of the first group of recesses or the second group of recesses comprising the recess located away from the perimeter of the first surface, wherein an area of each recess of the first group of recesses is substantially equal and an area of each recess of the second group of recesses is substantially equal, the area of each recess of the first group of recesses being smaller than the area of each recess of the second group of recesses, the recesses of the first group of recesses being arranged in a first row and the recesses of the second group of recesses being arranged in a second row, the first row and the second row being arranged in parallel to each other.

9. An electrowetting display device according to claim 2, at least part of the first surface lying in a plane, wherein a shape of each recess of the plurality of recesses, determined by a respective cross section in the plane of each recess of the plurality of recesses, is substantially equal.

10. An electrowetting display device according to claim 2, wherein each of the plurality of recesses is overlapped by the display area of the electrowetting element.

11. An electrowetting display device according to claim 1, wherein the display area comprises a collection region for collection of the first fluid and a region outside of the collection region, the collection region overlapping the recess, the recess having a location in the first surface determines a location of the collection region and which determines a path for movement of the first fluid from the region outside of the collection region to the collection region in response to applying a non-zero voltage between the electrode and the second fluid.

12. An electrowetting display device according to claim 1, wherein the recess is located substantially centrally in the first surface.

13. An electrowetting display device according to claim 1, at least part of the first surface lying in a plane, wherein a cross section of the recess in the plane has an outline of a figure of eight, a circle or an ellipse.

14. An electrowetting display device according to claim 1, wherein the electrode is formed of one or more of: indium tin oxide, or a material which is transmissive for light.

15. An electrowetting display device according to claim 1, wherein the recess comprises one or more of: a depression of the first surface, or an opening through the electrode.

16. An electrowetting display device according to claim 1, comprising a first support plate comprising the electrode, the display area, and the at least one dielectric material, the at least one dielectric material comprising a dielectric layer on the first surface and at least partly filling the recess.

17. An electrowetting display device according to claim 1, wherein a display effect is providable by the electrowetting element depending on an extent of the display area adjoined by the first fluid, the display effect being controllable with a voltage applied between the electrode and the second fluid.

18. An electrowetting display device according to claim 1, wherein, with the electrowetting element in a state with the first fluid fully contracted, the recess is at least partly overlapped by part of the display area adjoined by the first fluid.

19. An electrowetting display device according to claim 1, comprising a plurality of recesses, the plurality of recesses comprising the recess located away from the perimeter of the first surface, at least two recesses of the plurality of recesses separated by a region of the electrode having a substantially uniform thickness.

20. An electrowetting display device according to claim 1, comprising a plurality of recesses, the plurality of recesses comprising the recess located away from the perimeter of the first surface, the planar second surface extending between at least two recesses of the plurality of recesses.

21. A method of manufacturing a support plate for an electrowetting element, the method comprising:
    a) depositing on a surface an electrically conductive material for forming an electrode of the support plate of the electrowetting element, the electrowetting element comprising a first fluid and a second fluid immiscible with the first fluid, and a display area; and
    b) patterning the electrically conductive material according to a pattern to form a recess of a first surface of the electrode, the recess located away from a perimeter of the first surface of the electrode and formed by a region of the electrode having a reduced thickness compared with a thickness of a region of the electrode immediately surrounding the recess, the electrode further comprising a planar second surface extending from the region of the electrode having the reduced thickness and beyond the region of the electrode immediately surrounding the recess, at least part of the first surface of the electrode being located for positioning between the planar second surface and the display area.

22. A method according to claim 21, comprising:
    c) depositing a dielectric material on the electrically conductive material, after the patterning the electrically conductive material, to form a layer of the dielectric material on the electrode, the dielectric material of the layer of the dielectric material at least partly filling the recess.

23. A method according to claim 22, wherein the pattern is for forming a plurality of recesses, the plurality of recesses comprising the recess located away from the perimeter of the first surface of the electrode, the dielectric material of the layer of the dielectric material at least partly filling the plurality of recesses with the dielectric material.

24. A method according to claim 21, wherein the pattern is for forming the recess as one or more of: a depression of the first surface of the electrode, or an opening through the electrode.

* * * * *